US 7,899,768 B2

(12) United States Patent
Grose et al.

(10) Patent No.: US 7,899,768 B2
(45) Date of Patent: Mar. 1, 2011

(54) METHODS AND SYSTEMS FOR CONSTRUCTING A SCALABLE HIERARCHICAL FEED-FORWARD MODEL FOR FABRICATING A PRODUCT

(75) Inventors: David L. Grose, Poulsbo, WA (US); Thomas E. Sherer, Everett, WA (US)

(73) Assignee: The Boeing Company, Chicago, IL (US)

( * ) Notice: Subject to any disclaimer, the term of this patent is extended or adjusted under 35 U.S.C. 154(b) by 614 days.

(21) Appl. No.: 11/771,380

(22) Filed: Jun. 29, 2007

(65) Prior Publication Data

US 2009/0006293 A1  Jan. 1, 2009

(51) Int. Cl.
G06F 17/00 (2006.01)
(52) U.S. Cl. ...................................................... 706/45
(58) Field of Classification Search ............... 706/20, 706/45–48, 62; 703/1
See application file for complete search history.

(56) References Cited

U.S. PATENT DOCUMENTS

| 5,461,699 | A | * | 10/1995 | Arbabi et al. ................. 706/21 |
| 5,806,056 | A | * | 9/1998 | Hekmatpour ................. 706/50 |
| 6,141,776 | A | | 10/2000 | Grose et al. |
| 6,220,743 | B1 | * | 4/2001 | Campestre et al. ........... 700/97 |
| 6,292,830 | B1 | | 9/2001 | Taylor et al. |
| 6,778,863 | B1 | * | 8/2004 | Lienhard et al. ............. 700/32 |
| 6,877,153 | B2 | | 4/2005 | Konnersman |
| 7,460,984 | B1 | * | 12/2008 | Clark et al. .................... 703/2 |
| 7,542,892 | B1 | * | 6/2009 | Clark et al. .................... 703/19 |
| 2001/0032029 | A1 | | 10/2001 | Kauffman |
| 2002/0054117 | A1 | | 5/2002 | van Dantzich et al. |
| 2003/0014379 | A1 | | 1/2003 | Sais et al. |
| 2004/0088577 | A1 | | 5/2004 | Render |
| 2004/0090472 | A1 | | 5/2004 | Risch et al. |
| 2005/0076313 | A1 | | 4/2005 | Pegram et al. |
| 2005/0096950 | A1 | | 5/2005 | Caplan et al. |
| 2005/0180330 | A1 | | 8/2005 | Shapiro |
| 2005/0197875 | A1 | | 9/2005 | Kauffman |
| 2006/0235658 | A1 | * | 10/2006 | Nitta et al. ................... 703/2 |
| 2008/0109475 | A1 | * | 5/2008 | Burmester et al. .......... 707/102 |
| 2008/0205280 | A1 | * | 8/2008 | Saphir ......................... 370/236 |

OTHER PUBLICATIONS

Zhang, Forecasting with artificial neural networks the state of the art, Jul. 31, 1997, International Journal of Forecasting Elsevier Science B.V., pp. 35-63.*

* cited by examiner

Primary Examiner—David R Vincent
(74) Attorney, Agent, or Firm—Armstrong Teasdale LLP

(57) ABSTRACT

Methods and systems for constructing a scalable feed-forward process are provided. The method includes identifying a plurality of segments of the process wherein the segments define a feed-forward network which is used to constrain the creation of more detailed segment components. The method also includes modeling each component by defining component outputs and determining component inputs that are combinable using the model to produce the defined output, ordering the components hierarchically based on the respective component outputs and inputs, determining segment inputs and outputs based on the component outputs and inputs, and ordering the segments hierarchically based on the respective segment outputs and inputs.

18 Claims, 17 Drawing Sheets

METHODS AND SYSTEMS FOR CONSTRUCTING A SCALABLE HIERARCHICAL FEED-FORWARD MODEL FOR FABRICATING A PRODUCT

BACKGROUND

Embodiments of the disclosure relate generally to methods and systems for computer systems and more particularly, to methods and systems for constructing scalable feed-forward processes.

It is difficult and expensive to develop a complex process to produce complex systems such as an aerospace product or a power plant. A specially constructed information model representing a process which can grow or shrink if necessary, provide multiple layers of planning and progress visibility, and provide high certainty of a desired result will generate a less difficult and less expensive implementation of the process than a model constructed in a less formal or ad-hoc fashion. However, constructing such a process model is in itself a difficult and expensive task.

A product may be described in terms of its component breakdown. A process describing the construction of such a product may be defined by describing the tasks and precedences associated with the creation of each component. The process describing the creation of a given physical product may seem intuitive since its physical realization, through production and assembly, will test the feasibility of such a process. Products whose components do not have an obvious physical manifestation, such as the information produced and consumed during the design and development of an aerospace product, are produced by processes which may not be intuitively verifiable.

Existing methods approach modeling processes graphically through flow charts, schematics or diagrams. The modeler represents the process as perceived by others or himself. There is no analytical foundation to validate the representation or to determine its feasibility or evaluate its internal dynamics. Without a validation or feasibility context, it is undeterminable whether the process can provide the expected results based on this representation. Expectations of the internal behavior of processes are currently non-existent for large scale complex processes like product development. The enforcement of some kind of model structure is not evident, leaving dissimilar characteristics of a process not recognizable and resulting in over-simplification to avoid dilemmas or aspects of the process that are not explainable.

Existing approaches do not model the innate complexity of a large-scale process in a manner to understand or overcome the conditions which contribute to poor performance experienced during development program execution. Therefore they do not provide the visibility necessary to understand how the lack of large-scale integration manifests on development programs. As a result, the unnecessary and unplanned rework, inappropriate concurrency, duplicative work and unacknowledged internal complex iteration are not avoidable, resulting in extended development time and cost overruns. Existing approaches are not oriented towards combining and reusing processes in new contexts.

What are needed are methods and systems for constructing scalable robust feed-forward processes.

SUMMARY

In one embodiment, a method for constructing a scalable feed-forward process includes identifying a plurality of segments of the process wherein the segments define a feed-forward network which is used to constrain the creation of more detailed segment components. The method also includes modeling each component by defining component outputs and determining component inputs that are combinable using the model to produce the defined output, ordering the components hierarchically based on the respective component outputs and inputs, determining segment inputs and outputs based on the component outputs and inputs, and ordering the segments hierarchically based on the respective segment outputs and inputs.

In another embodiment, a computer system is configured to identify a plurality of segments of the process wherein the segments define a feed-forward network which is used to constrain the creation of more detailed segment components and model each component by defining component outputs and determining component inputs that are combinable using the model to produce the defined output. The system is also configured to order the components hierarchically based on the respective component outputs and inputs, determine segment inputs and outputs based on the component outputs and inputs, and order the segments hierarchically based on the respective segment outputs and inputs.

In yet another embodiment, a method of generating large scale complex system integration of a process includes identifying segments of the process wherein the segments include at least one of external products, internal products, and components. The method also includes organizing the segments into first level hierarchy such a feed-forward network is formed and decomposing subsequent levels of breakdown hierarchy using a process model of the feed forward network.

DETAILED DESCRIPTION

A scalable process is one which can be combined with other scalable processes, and result in a larger scalable process. This is a feasible method for the construction of very large scale processes. Larger problems are more difficult to understand and manage due to emergent scale and complexity not present in smaller processes. Partitioning the components of a product in an understandable and correct manner using rigorous logic is essential to the creation of such large scale processes. A hierarchical structure is an efficient method for such partitioning. The relationships between product components are the elements of process, and when constrained in a feed-forward manner, ensure component production. The combination of feed-forward constraint and hierarchical structure results in a scalable, manageable and predictable process. This combination provides a unique framework for further process development and management.

The below-described embodiments of methods and systems formalize an approach for creation of processes at each level of hierarchical breakdown. Each such process is expressed as a feed-forward network which is used to constrain the creation of the more detailed process description for the task and data precedences associated with the component breakdowns. Selection of the final products, or outputs, and selection of sufficient data or other products needed to produce each output initiates an interactive modeling procedure. Each of these data or products, in turn, are treated as final products during the modeling procedure, until all products at a given level of hierarchy are sufficiently specified. Two models constructed in this way, with the same level of breakdown, can be combined to create a larger scale model.

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a process of constructing scalable hierarchical feed-forward networks. However, it is contemplated that this disclosure has general application to forming networks of processes of many types.

Figure 1:
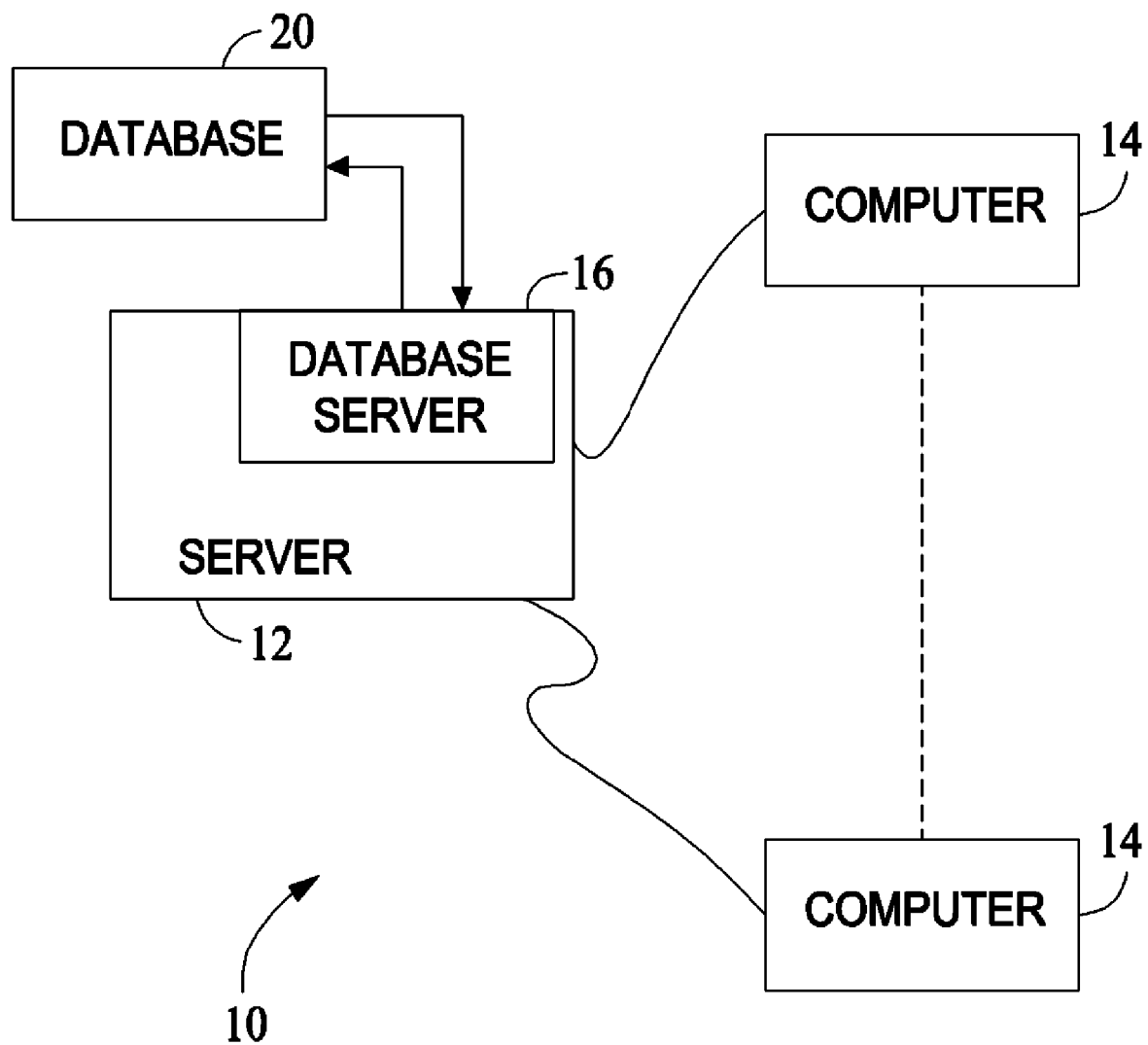
FIG. 1 is a simplified block diagram of an exemplary embodiment of a Hierarchical Process Construction System (HPCS)

FIG. 1 is a simplified block diagram of an exemplary embodiment of a Hierarchical Process Construction System (HPCS) 10 including a server system 12, and a plurality of client sub-systems, also referred to as client systems 14, connected to server system 12. Computerized modeling and grouping tools, as described below in more detail, are stored in server 12 and can be accessed by a requester at any one of computers 14. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems, and special high-speed ISDN lines. Client systems 14 could be any device capable of interconnecting to the Internet including a web-based phone, personal digital assistant (PDA), or other web-based connectable equipment. A database server 16 is connected to a database 20 containing information relating to feed forward processes for example, hierarchical scalable feed forward processes, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
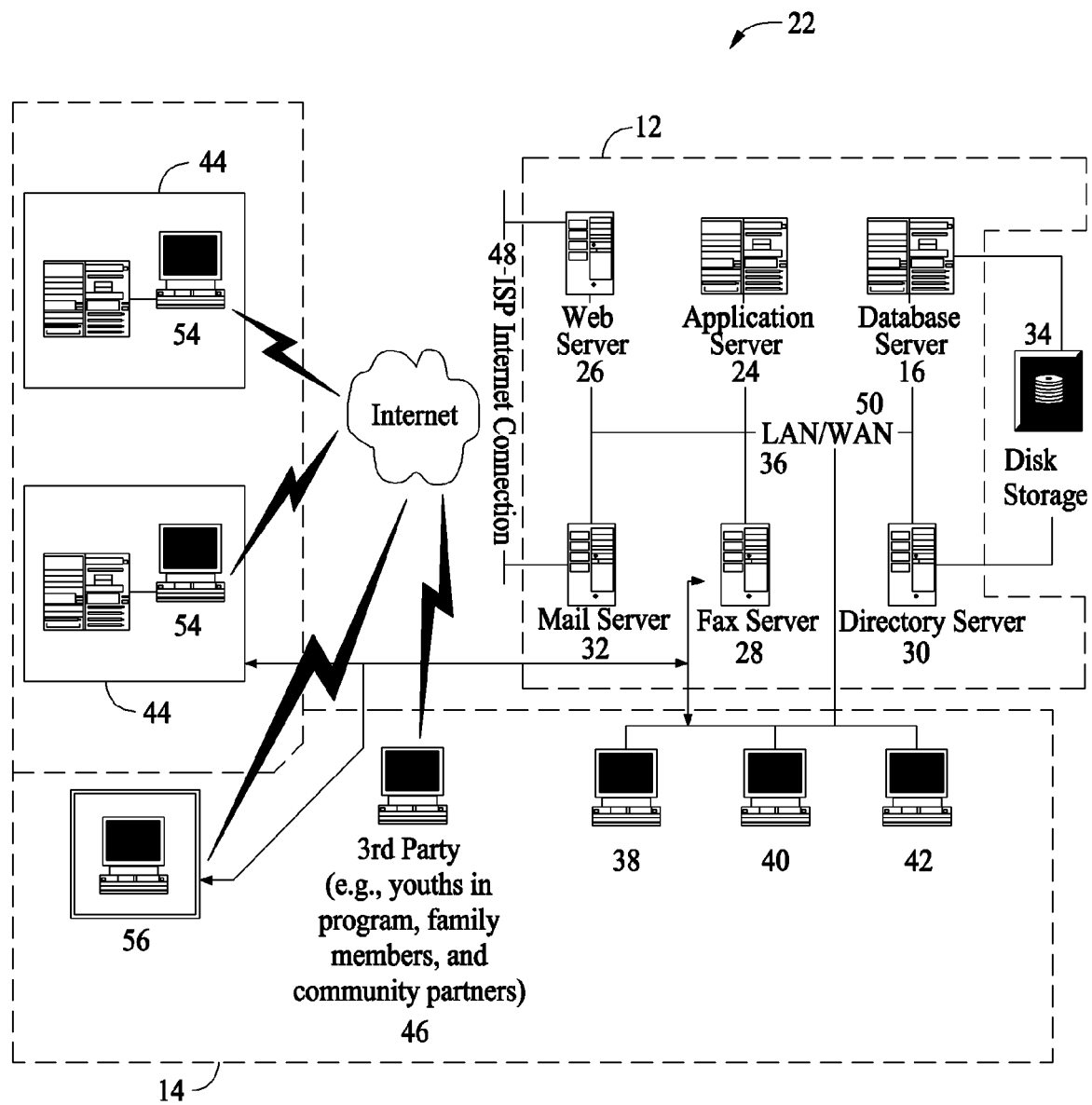
FIG. 2 is an expanded block diagram of an exemplary embodiment of a server architecture for the Hierarchical Process Construction System shown in FIG. 1.

FIG. 2 is an expanded block diagram of an exemplary embodiment of a server architecture for a Hierarchical Process Construction System 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation 38, 40, and 42 may be a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties 46 using an ISP Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

System 22 is configured for constructing scalable robust feed-forward processes defined using a hierarchical product framework that encompasses only feasible internal product interactions. Embodiments of system 22 permit creation of feed-forward processes using back-chaining guided through hierarchical decomposition and the ability to combine two or more such models using simple and consistent rules to produce a single valid large scale process model.

System 22 minimizes modeling effort for the development of large scale processes or systems, enables robust parallel modeling activity and enables focus on specific problem issues individually to produce a process model which is manageable at multiple levels, has definite beginning and end points boundaries, and can be scaled while remaining manageable.

A process described by this modeling method includes external products and segments. External products are organized into a composition hierarchy. Segments are internal products which are not components of another internal product. An internal product may contain components and may require external products or internal products as inputs. A component is an internal product which is part of another internal product. Segments and components are organized into a composition hierarchy within a process. A component may require other components as inputs. External, internal, and component inputs form one or more feed-forward networks within the process model. Feed-forward networks formed at each level of the process composition hierarchy are not connected to each other.

A process containing one or more external products and two or more segments is created. Process construction should be started by selecting one or more segments as final products of the process. The feed-forward network of the segment level is initialized by selecting other segments required for the production of a final segment as its input. Then, any input which does not violate the order of the feed-forward network may be specified, further augmenting the feed-forward network. If a segment requires only external products as inputs to produce its product, it is an initial product. Establishment of a feed-forward network which connects initial products to final products and containing all segments of the model is necessary to complete this phase of the modeling process. New external products and segments may be added as needed as long as proper connection to the feed-forward network is established. This implies that all segments must have at least one internal or external input specified.

Segments are internal products of the process, which are intended to be broken into more detailed components. External products are broken into more detailed external products and differ from internal products in that no input relationships between external products are specified. Internal and external products form a hierarchy rooted at the process. When creating a new level of a model, this hierarchy is expanded uniformly by adding components and external products which are connected into a feed-forward network at this new level. To create the next level of the model, each segment has two or more components defined. Similarly, the external products required for the process each have at least two detailed external products composing them defined.

The selection of inputs to components is more restrictive than the selection of inputs into segments. A sub-network, which is also feed-forward and connecting only components of a single segment, is established for each segment by specifying the component inputs of each component. Further, the components of the inputs of the containing segment are the only possible internal inputs to a component. The external inputs to a component are constrained similarly. The addition of internal and external inputs to a component integrates that component and the component sub-network into a feed-forward network at the component's level. At least one of a segment's components must input at least one of the components of each of that segment's internal inputs, and similarly, for specifying external inputs for the component from the segment's external inputs.

The process hierarchy may be further broken down by adding levels of components and external products. The component inputs of each containing component constrain the internal inputs of the contained component in the same way the internal inputs of a segment constrain the internal inputs of its components. Otherwise, levels of components and their resulting feed-forward networks are specified in the same way as the first level of components of segments.

Two process models with the same level of hierarchical breakdown constructed using this method may be combined if products of one of the models can be mapped to the external inputs of the other. Similarly, if the segment level feed-forward networks of the two models are such that the external input requirements of one do not precede the external input requirements into the other, the models may be combined into a single process.

Figure 3:
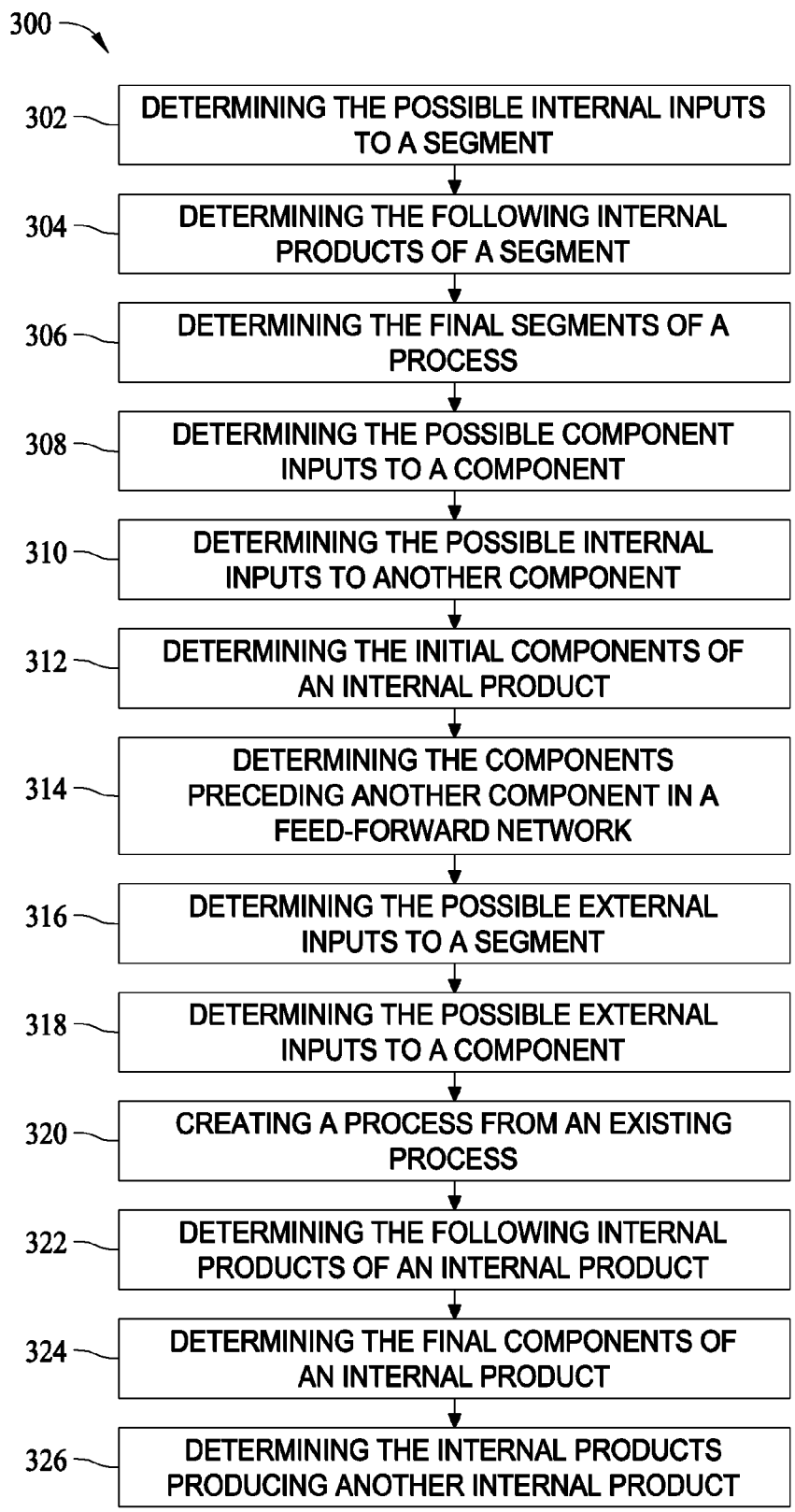
FIG. 3 is a flow chart of an exemplary method of constructing a scalable robust feed-forward process.

FIG. 3 is a flow chart of an exemplary method 300 of constructing a scalable robust feed-forward process. In the exemplary embodiment, the feed-forward process uses a hierarchical product framework that encompasses substantially only feasible internal product interactions. To maintain consistency during construction of the feed-forward process and to facilitate the capability of being scalable, only possible internal inputs to an internal product are allowed. In the exemplary embodiment, method 300 includes determining 302 the possible internal inputs to a segment, determining 304 the following internal products of a segment, determining 306 the final segments of a process, and determining 308 the possible component inputs to a component. Method 300 further includes determining 310 the possible internal inputs to another component, determining 312 the initial components of an internal product, determining 314 the components preceding another component in a feed-forward network, and determining 316 the possible external inputs to a segment. Method 300 also includes determining 318 the possible external inputs to a component, creating 320 a process from an existing process, determining 322 the following internal products of an internal product, determining 324 the final components of an internal product, and determining 326 the internal products producing another internal product.

Figure 4:
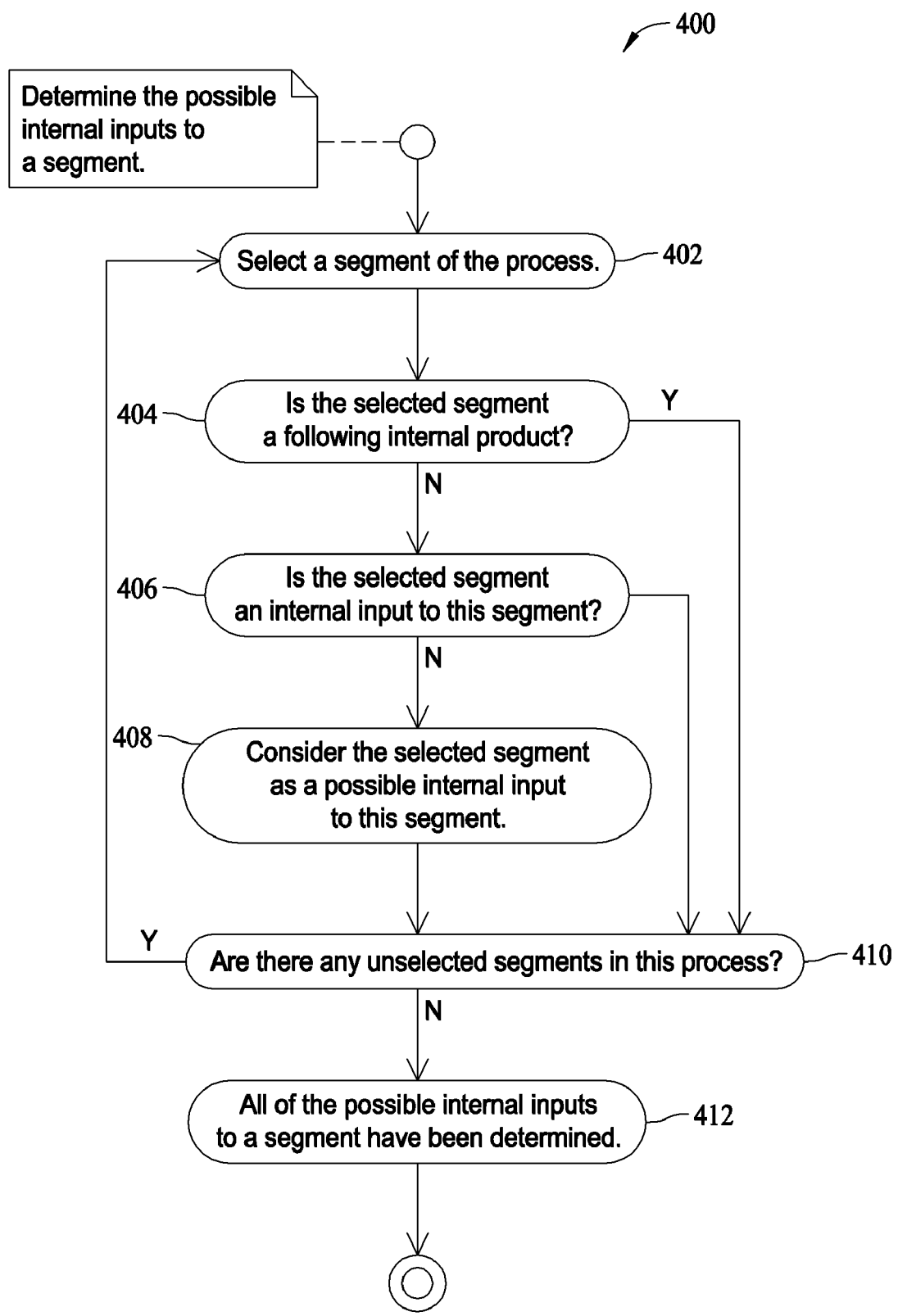
FIG. 4 is a flow chart of an exemplary method of determining the possible internal inputs to a segment.

FIG. 4 is a flow chart of an exemplary method 400 of determining the possible internal inputs to a segment. Method 400 includes selecting 402 a segment of the process and determining 404 if the selected segment is a following internal product. If no, then proceed to determining 406 if the selected segment an internal input to this segment. If yes, then proceed to determining 410 if there are any unselected segments in this process. If step 406 is no, then proceed to considering 408 the selected segment as a possible internal input to this segment and then proceed to determining 410 if there are any unselected segments in this process. If step 408 is yes, then proceed to determining 410 if there are any unselected segments in this process. If step 410 is yes, method 400 loops back to step 402 to select another segment of the process. The steps of method 400 end when all of the possible internal inputs to a segment have been determined 412.

Figure 5:
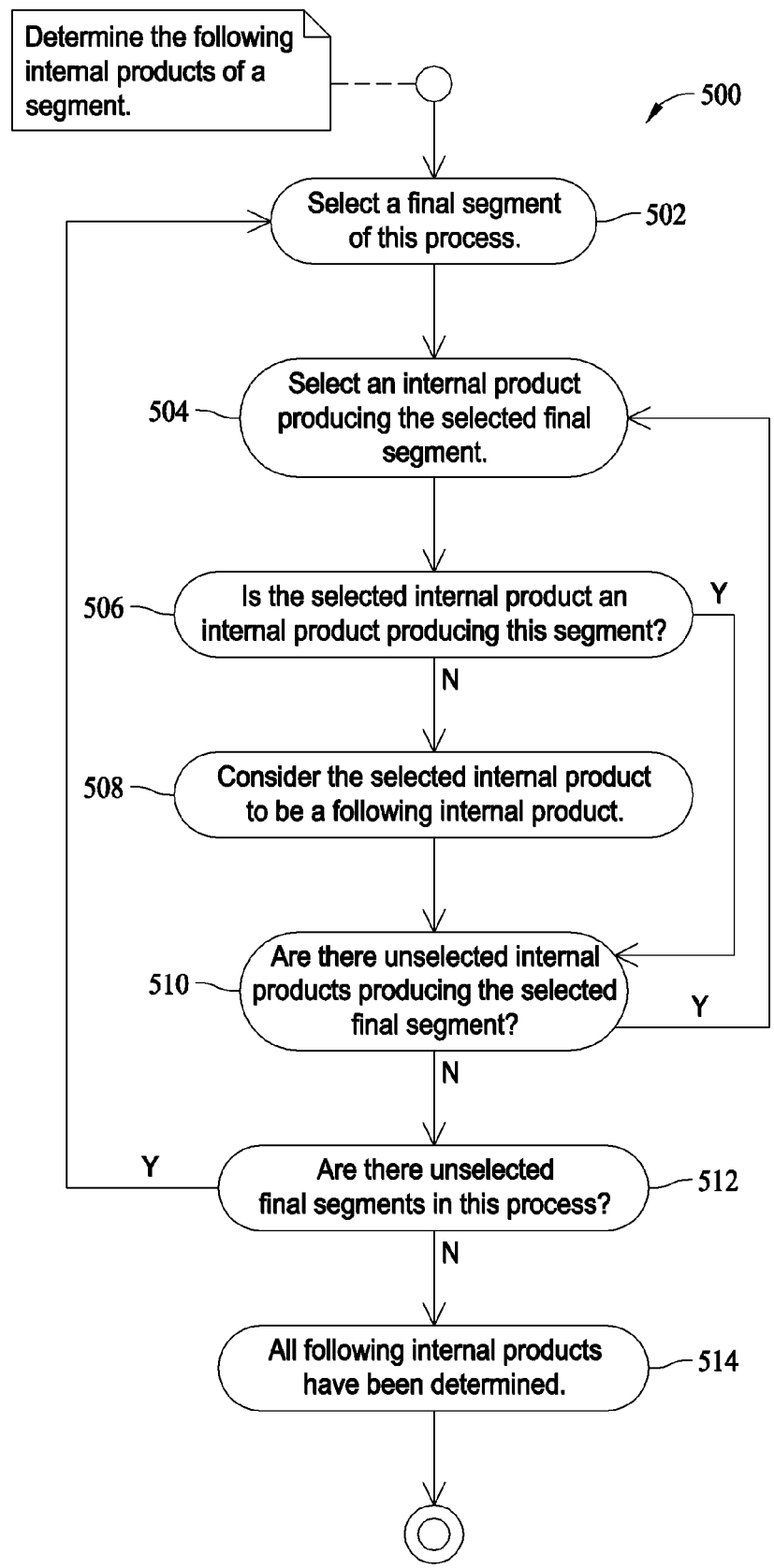
FIG. 5 is a flow chart of an exemplary method of determining the following internal products of a segment.

FIG. 5 is a flow chart of an exemplary method 500 of determining the following internal products of a segment. In the exemplary embodiment, method 500 includes selecting 502 a final segment of this process and selecting 504 an internal product producing the selected final segment. Method 500 also includes determining 506 if the selected internal product an internal product producing this segment. If no, then method 500 proceeds to considering 508 the selected internal product to be a following internal product. If yes, then method 500 proceeds to determining 510 if there are unselected internal products producing this selected final segment. If step 510 is determined to be yes, then method 500 proceeds back to step 504. If step 510 is determined to be no, then method 500 proceeds to determining 512 if there are unselected final segments in this process. If yes, then method 500 proceeds back to step 502 to select a final segment of this process. The steps of method 500 end when all of the following internal products have been determined 514.

Figure 6:
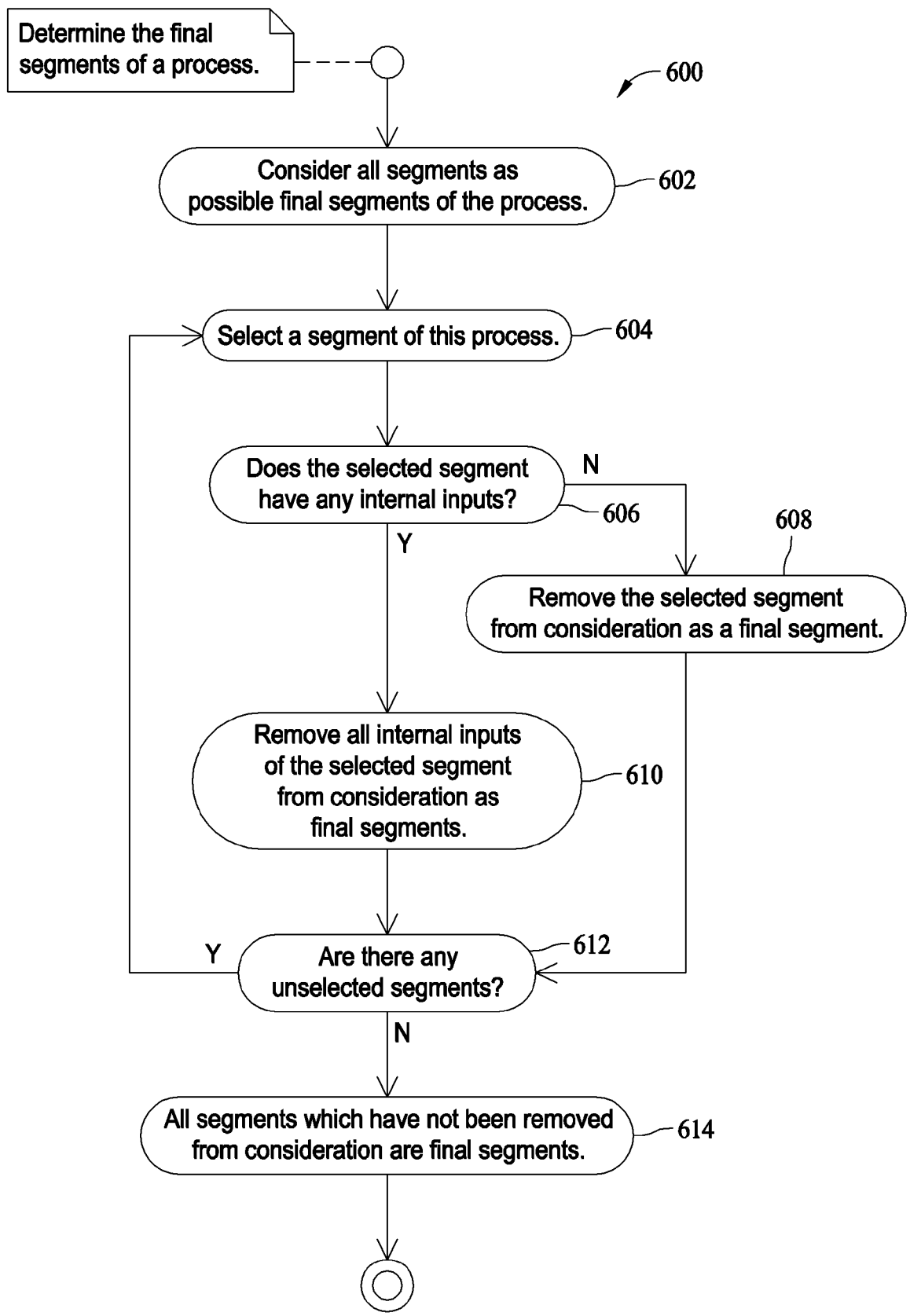
FIG. 6 is a flow chart of an exemplary method of determining the final segments of a process.

FIG. 6 is a flow chart of an exemplary method 600 of determining the final segments of a process. In the exemplary embodiment, method 600 includes considering 602 all segments as possible final segments of the process and selecting 604 a segment of this process. Method 600 also includes determining 606 if the selected segment has any internal inputs. If no, method 600 proceeds to removing 608 the selected segment from consideration as a final segment. If step 606 is determined to be yes, method 600 proceeds to removing 610 all internal inputs of the selected segment from consideration as final segments. Method 600 then determines 612 if there are any unselected segments. If yes, method 600 proceeds back to step 604. The steps of method 600 end when all of the segments which have not been removed from consideration are final segments 614.

Figure 7:
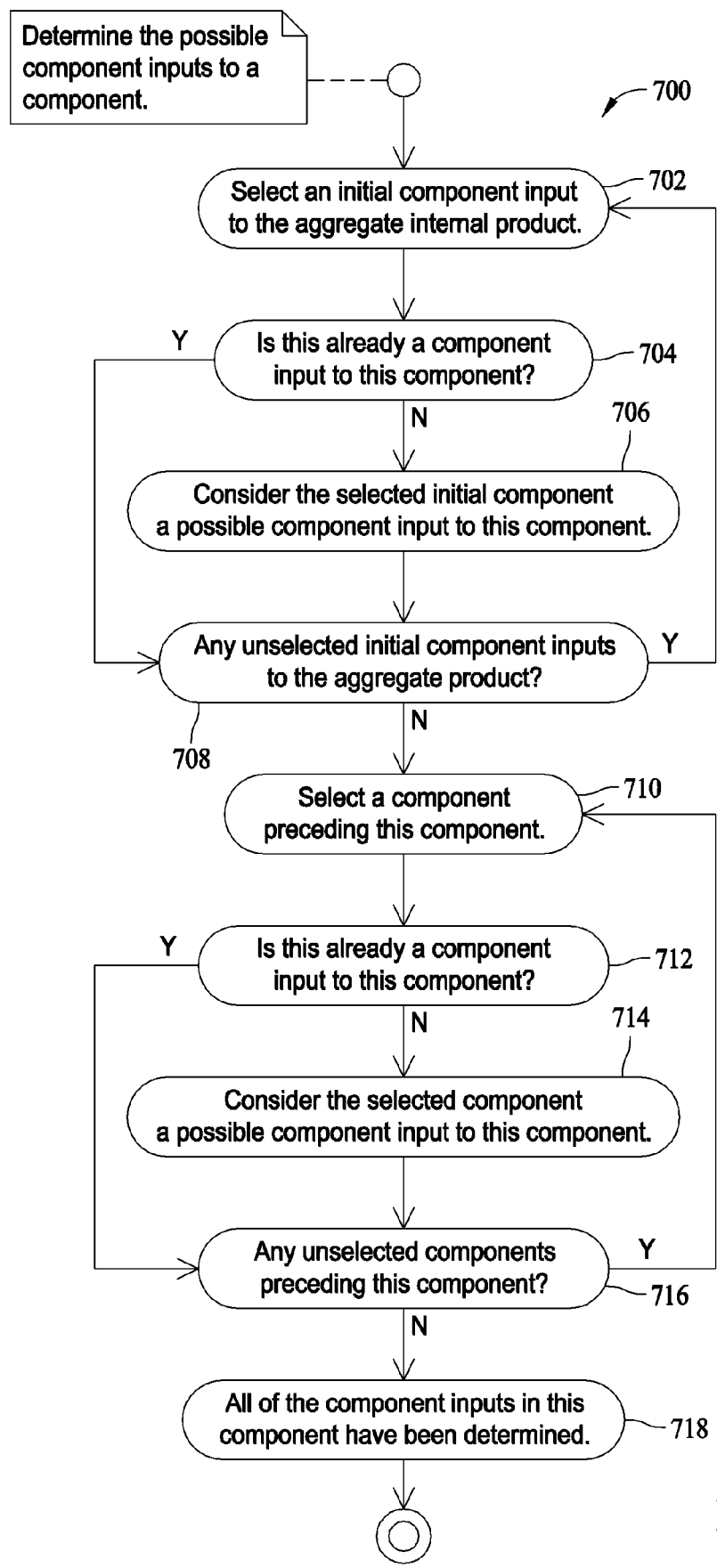
FIG. 7 is a flow chart of an exemplary method of determining the possible component inputs to a component.

FIG. 7 is a flow chart of an exemplary method 700 of determining the possible component inputs to a component. In the exemplary embodiment, method 700 includes selecting 702 an initial component input to the aggregate internal product and determining 704 if the selected input is a component input to this component. If no, method 700 considers 706 the selected initial component a possible component input to this component. If yes, method 700 determines 708 if there are any unselected initial component inputs to the aggregate product. If yes, method 700 loops back to step 702, and if no method 700 proceeds to selecting 710 a component preceding this component. Method 700 then determines 712 if the selected component is already a component input to this component. If no, method 700 proceeds to considering 714 the selected component a possible component input to this component and then on to determining 716 if there are any unselected components preceding this component. If the selected component is determined to already be a component input to this component, method 700 proceeds directly to step 716. If it is determined 716 that there are unselected components preceding this component, method 700 loops back to step 710. The steps of method 700 end when all of the component inputs in this component have been determined 718.

Figure 8:
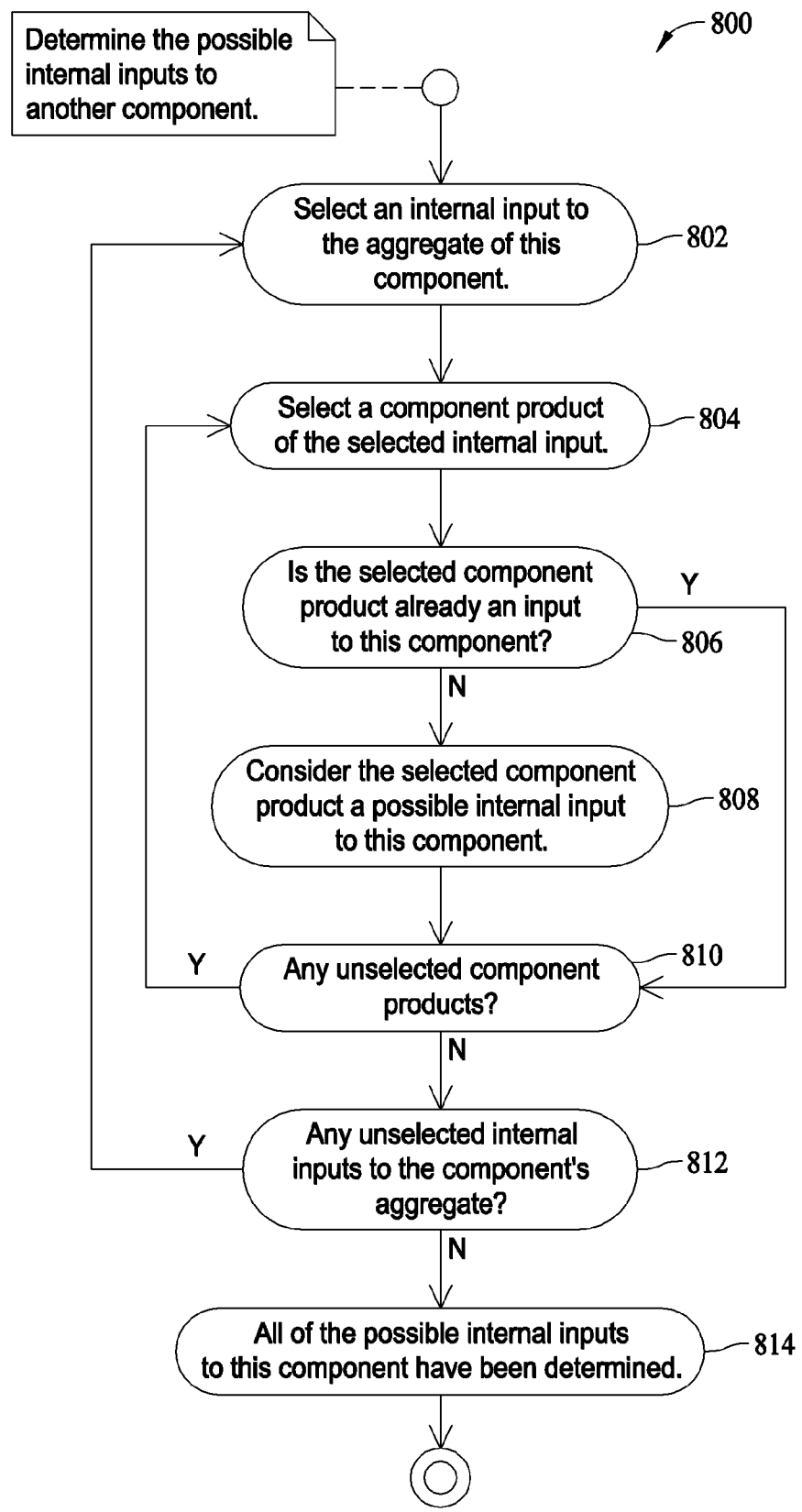
FIG. 8 is a flow chart of an exemplary method of determining the possible internal inputs to another component.

FIG. 8 is a flow chart of an exemplary method 800 of determining the possible internal inputs to another component. In the exemplary embodiment, method 800 includes selecting 802 an internal input to the aggregate of this component, selecting 804 a component product of the selected internal input, and determining 806 if the selected component product already an input to this component. If no, method 800 considers 808 the selected component product a possible internal input to this component. If yes, method 800 proceeds directly to determining 810 if there are any unselected component products. If it is determined that there are unselected component products, method 800 loops back to step 804. If it is determined that there are no unselected component products, method 800 proceeds to determining 812 if there are any unselected internal inputs to the component's aggregate. If yes, method 800 loops back to step 802. The steps of method 800 end when all of the possible internal inputs to this component have been determined 814.

Figure 9:
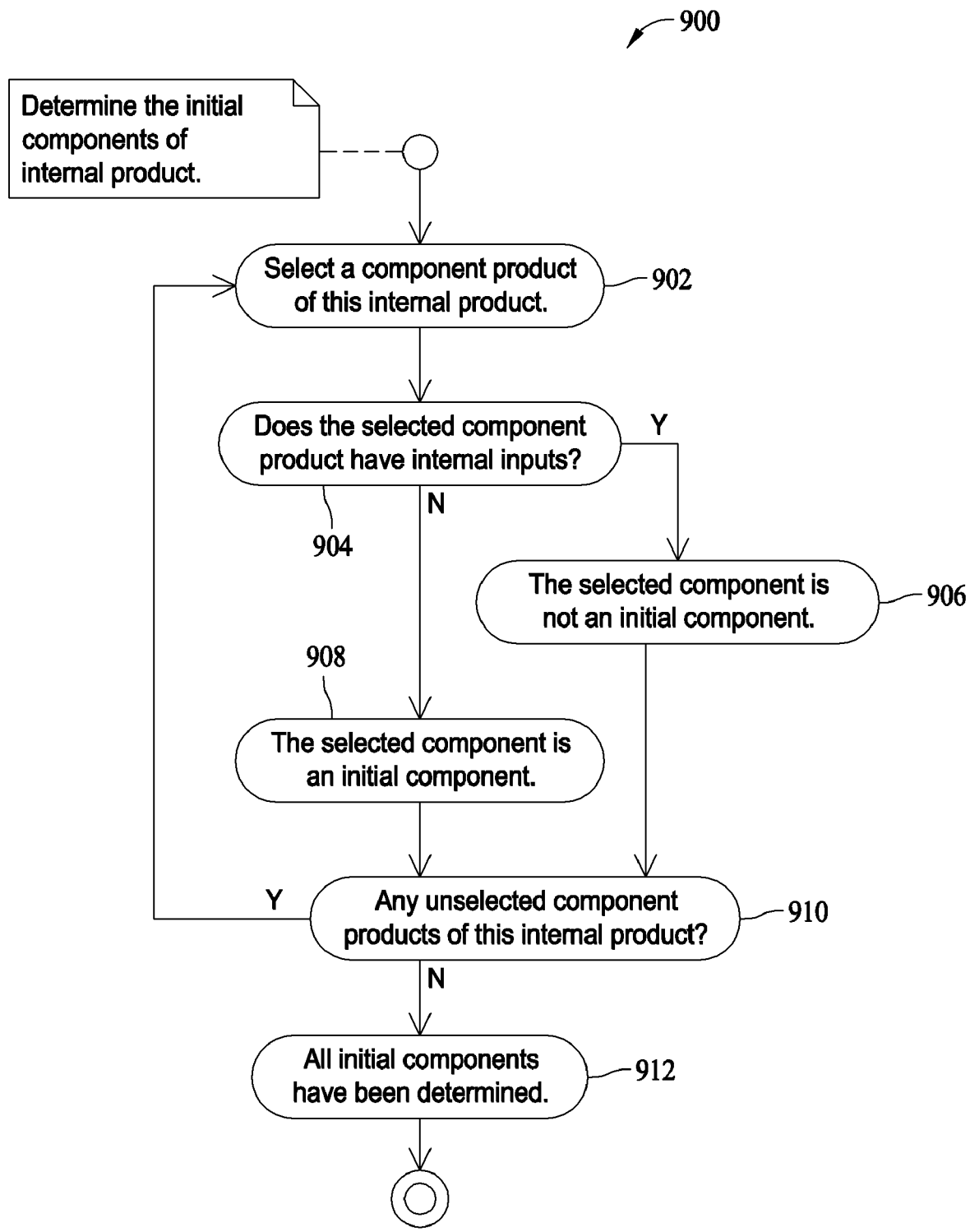
FIG. 9 is a flow chart of an exemplary method of determining the initial components of an internal product.

FIG. 9 is a flow chart of an exemplary method 900 of determining the initial components of an internal product. In the exemplary embodiment, method 900 includes selecting 902 a component product of this internal product and determining 904 if the selected component product has internal inputs. If yes, method 900 proceeds to indicating 906 the selected component as not an initial component and then proceeds to determining 910 if there are unselected component products of this internal product. If the selected component is determined 904 to have internal inputs, method 900 proceeds to indicating the selected component as being an initial component and then method 900 proceeds to step 912. If it is determined that there are unselected component products of this internal product, method 900 loops back to step 902. The steps of method 900 end when all of the initial components have been determined 912.

Figure 10:
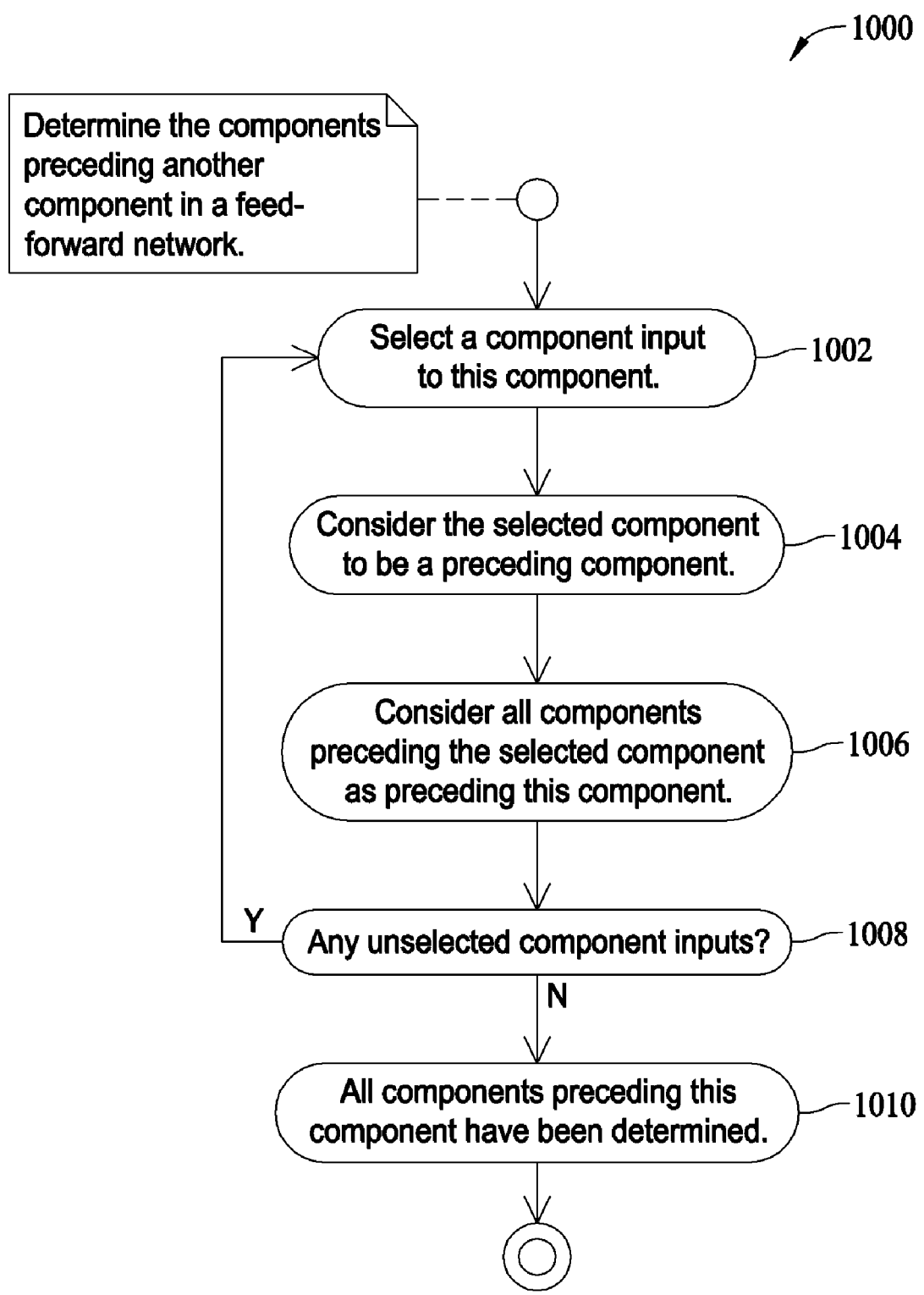
FIG. 10 is a flow chart of an exemplary method of determining the components preceding another component in a feed-forward network.

FIG. 10 is a flow chart of an exemplary method 1000 of determining the components preceding another component in a feed-forward network. In the exemplary embodiment, method 1000 includes selecting 1002 a component input to this component and considering 1004 the selected component to be a preceding component. Method 1000 includes considering 1006 all components preceding the selected component as preceding this component and determining 1008 if there are any unselected component inputs. If yes, method 1000 loops back to selecting 1002 a component input to this component. The steps of method 1000 end when all components preceding this component have been determined 1010.

Figure 11:
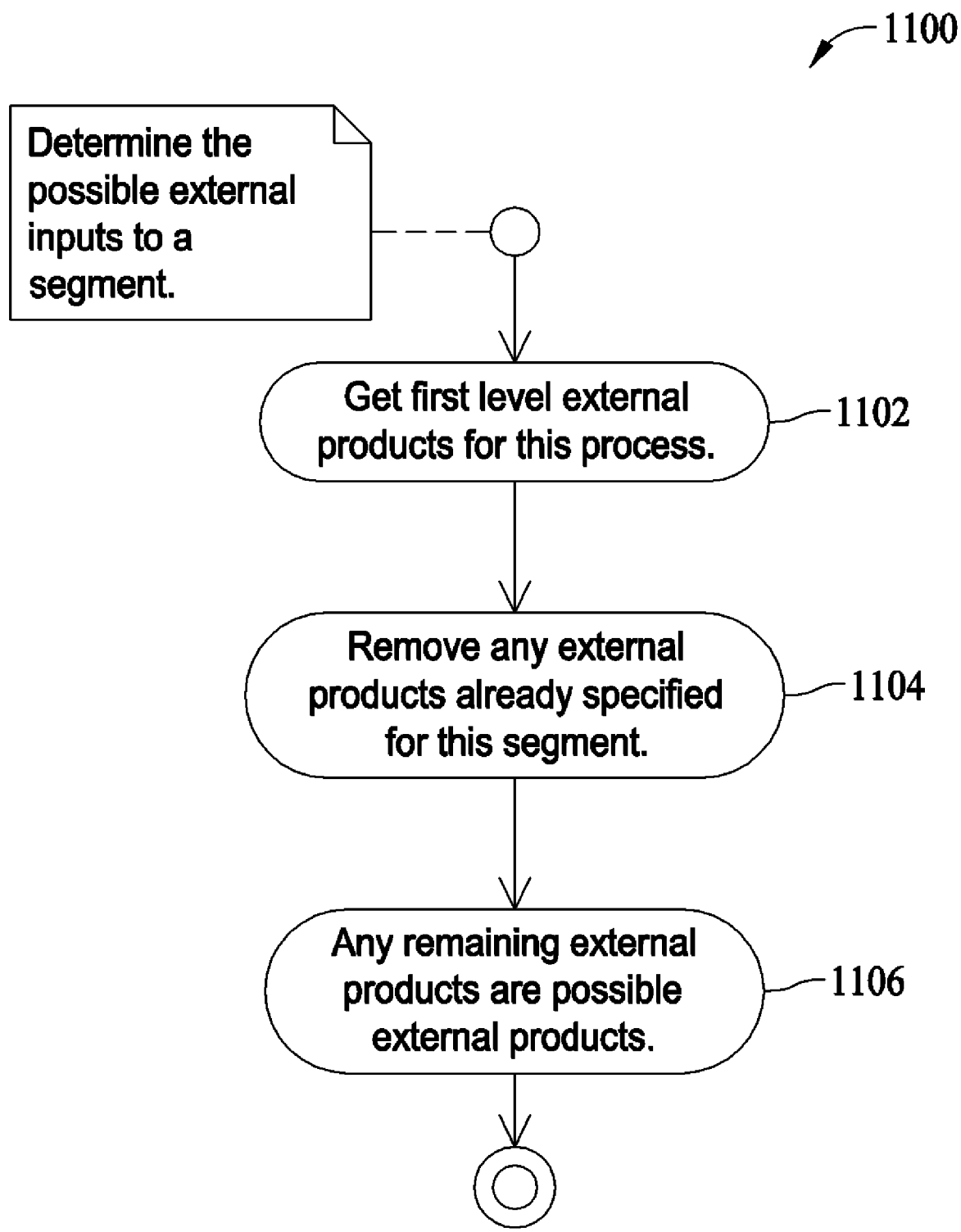
FIG. 11 is a flow chart of an exemplary method of determining the possible external inputs to a segment.

FIG. 11 is a flow chart of an exemplary method 1100 of determining the possible external inputs to a segment. In the exemplary embodiment, method 1100 includes retrieving 1102 first level external products for this process and removing 1104 any external products already specified for this segment. Method 1100 also includes indicating 1106 any remaining external products as possible external products.

Figure 12:
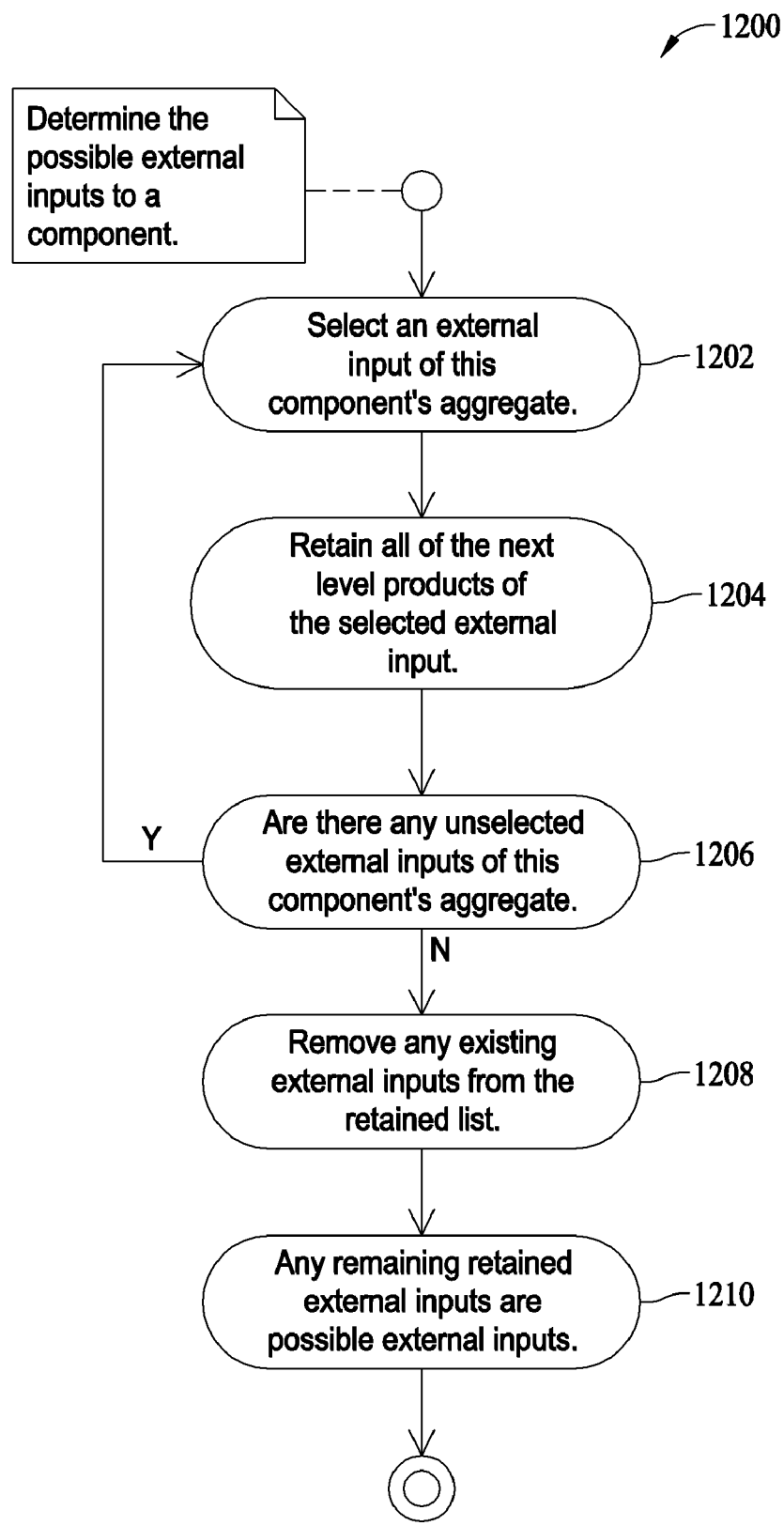
FIG. 12 is a flow chart of an exemplary method of determining the possible external inputs to a component.

FIG. 12 is a flow chart of an exemplary method 1200 of determining the possible external inputs to a component. In the exemplary embodiment, method 1200 includes selecting 1202 an external input of this component's aggregate and retaining 1204 all of the next level products of the selected external input. Method 1200 also includes determining 1206 if there are any unselected external inputs of this component's aggregate. If yes, method 1200 loops back to step 1202 and if no, method 1200 proceeds to removing any existing external inputs from the retained list. The steps of method 1200 end when any remaining retained external inputs are possible external inputs 1210.

Figure 13:
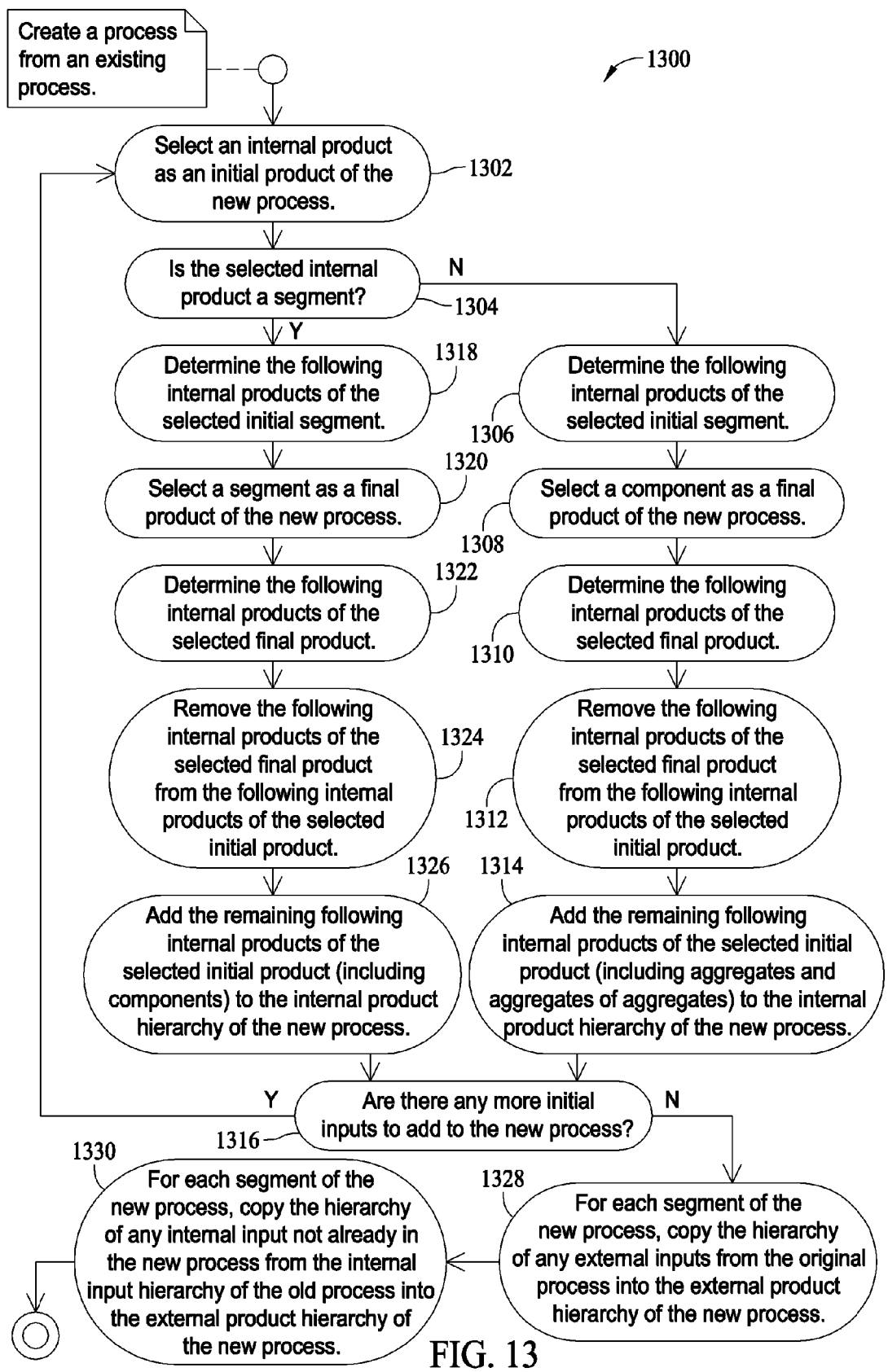
FIG. 13 is a flow chart of an exemplary method of creating a process from an existing process.

FIG. 13 is a flow chart of an exemplary method 1300 of creating a process from an existing process. In the exemplary embodiment, method 1300 includes selecting 1302 an internal product as an initial product of the new process and determining 1304 if the selected internal product is a segment. If the selected internal product is not a segment method 1300 proceeds to determining 1306 the following internal products of the selected final product and selecting a component as a final product of the new process. Method 1300 then determines 1310 the following internal products of the selected final product, removes 1312 the following internal products of the selected final product from the following internal products of the selected initial product, and then adds 1314 the remaining following internal products of the selected initial product (including aggregates and aggregates of aggregates) to the internal product hierarchy of the new process. Method 1300 then proceeds to determining 1316 if there are any more initial inputs to add to the new process.

If the selected internal product is determined 1304 to be a segment, method 1300 proceeds to determining 1318 if the following internal products of the selected initial segment and selecting 1320 a segment as a final product of the new process. Method 1300 then determines 1322 the following internal products of the selected final product, removes 1324 the following internal products of the selected final product from the following internal products of the selected initial product, and adds 1326 the remaining following internal products of the selected initial product (including components) to the internal product hierarchy of the new process. Method 1300 then proceeds to determining 1316 if there are any more initial inputs to add to the new process. If yes, method 1300 loops back to selecting 1302 an internal product as an initial product of the new process, and if it is determined 1316 that there are no more initial inputs to add to the new process, method 1300 proceeds to, for each segment of the new process, copying 1328 the hierarchy of any external inputs from the original process into the external product hierarchy of the new process. Method 1300 then proceeds to, for each segment of the new process, copying 1330 the hierarchy of any internal input not already in the new process from the internal input hierarchy of the old process into the external product hierarchy of the new process.

As used herein, a dictionary is an external product hierarchy which may be used as a reference during process construction. Each entry in the dictionary is assigned a unique identifier to distinguish it from similarly named entries. A process may be constructed having identifiers of a dictionary assigned to all of its products with those products having the same hierarchical relationships within the process as the identified products in the dictionary.

Two processes constructed using the same data dictionary where some internal products of the first process are external products of the second process, and no internal products of the second process are external products of the first, can be combined to create a new process. The new process is initialized by copying the first process. The internal products of the second process are then copied into the new process, replacing external input references with the internal product references which have the same dictionary identifier. Any external input references from the second process which are not replaced by references to internal products are replaced with references to existing external products already in the new process. If the external products are not found in the new process, they are added to the external product hierarchy of the new process by copying from the second process.

When creating a process by extraction from another process, initial and final internal products are selected from the segments and components of the source model, and the new model is created using the method described in FIG. 13. The details of producing following internal products supporting this method are described in FIG. 14. The method needed to determine final components of an internal product is described in FIG. 15. The method for determining internal products producing another internal product is described in FIG. 16.

Figure 14:
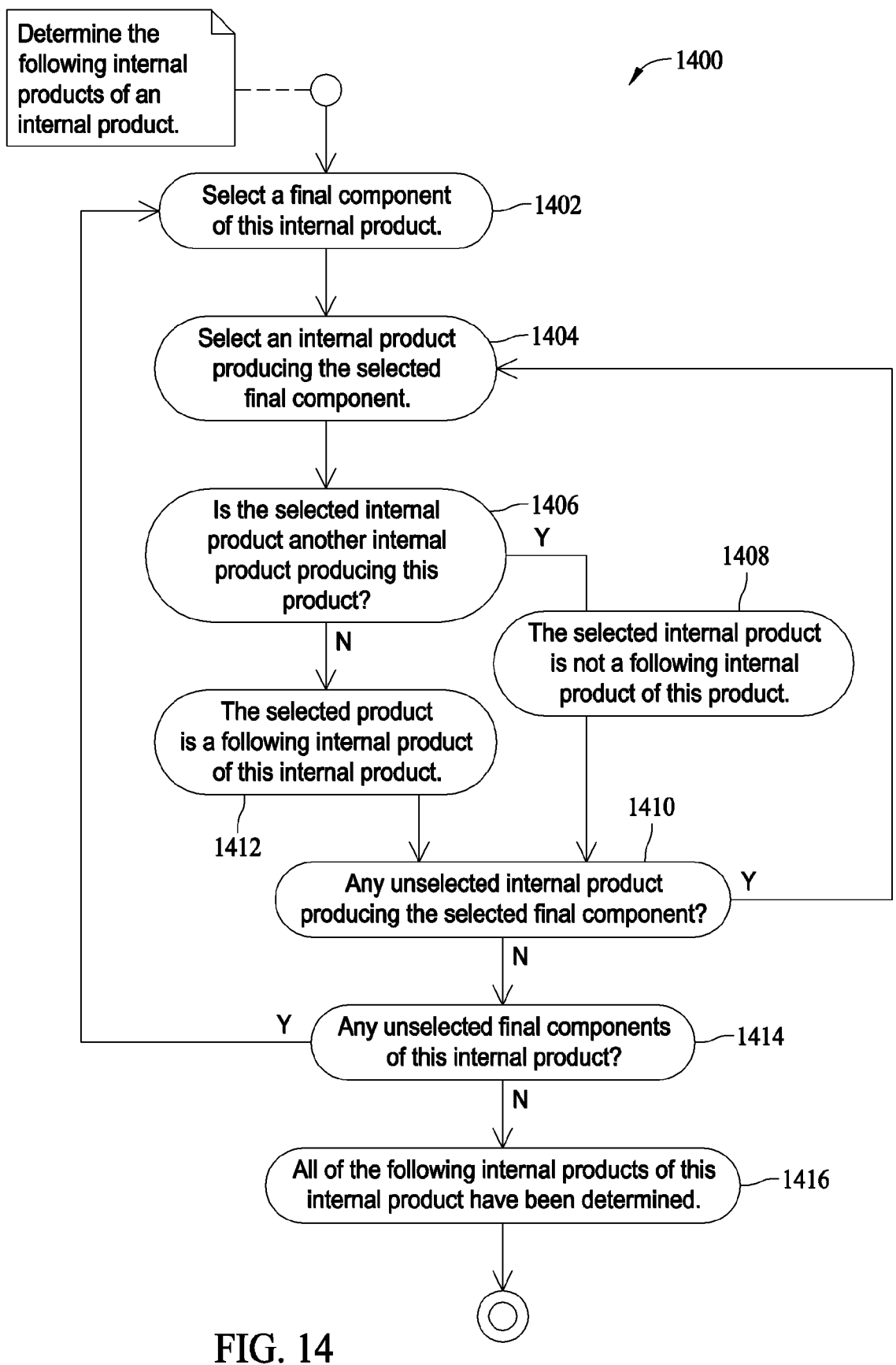
FIG. 14 is a flow chart of an exemplary method of determining the following internal products of an internal product.

FIG. 14 is a flow chart of an exemplary method 1400 of determining the following internal products of an internal product. In the exemplary embodiment, method 1400 includes selecting 1402 a final component of this internal product, selecting 1404 an internal product producing the selected final component, and determining 1406 if the selected internal product is another internal product producing this product. If yes, method 1400 proceeds to indicating 1408 the selected internal product is not a following internal product of this product, and then method 1400 proceeds to determining 1410 if any unselected internal product is producing the selected final component. If it is determined 1406 that the selected internal product not is another internal product producing this product, method 1400 proceeds to indicating 1412 the selected product is a following internal product of this internal product and then to determining 1410 if any unselected internal product is producing the selected final component. If yes, method 1400 loops back to selecting 1404 an internal product producing the selected final component and if no, method 1400 proceeds to determining 1414 if there are any unselected final components of this internal product. If yes, method 1400 loops back to selecting 1402 a final component of this internal product. The steps of method 1400 end when all of the following internal products of this internal product have been determined 1416.

Figure 15:
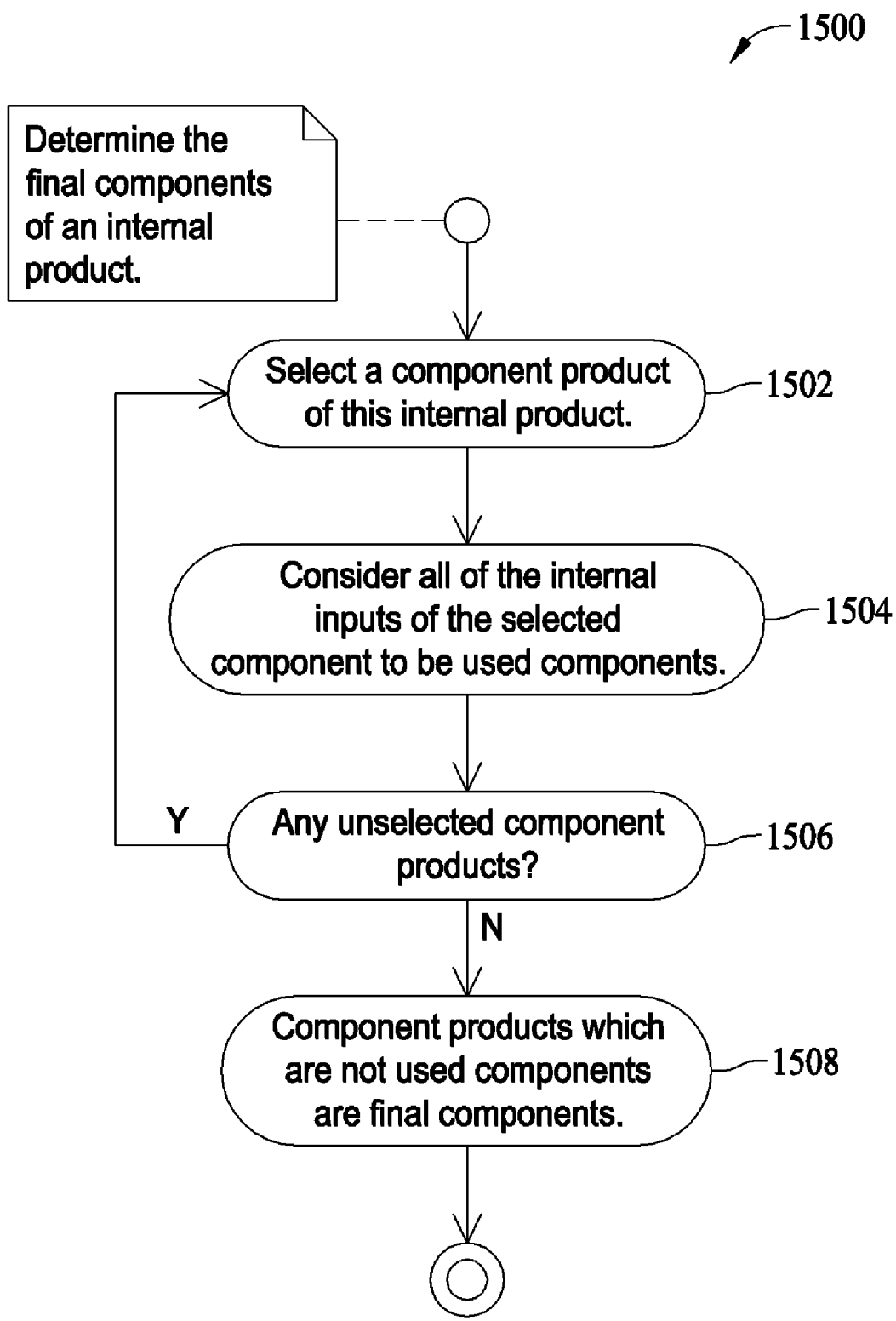
FIG. 15 is a flow chart of an exemplary method of determining the final components of an internal product.

FIG. 15 is a flow chart of an exemplary method 1500 of determining the final components of an internal product. In the exemplary embodiment, method 1500 includes selecting 1502 a component product of this internal product, considering 1504 all of the internal inputs of the selected component to be used components. Method 1500 also includes determining 1506 if there are any unselected component products. If yes, method 1500 loops back to selecting 1502 a component product of this internal product. The steps of method 1500 end when all component products which are not used components are indicated as being final components.

Figure 16:
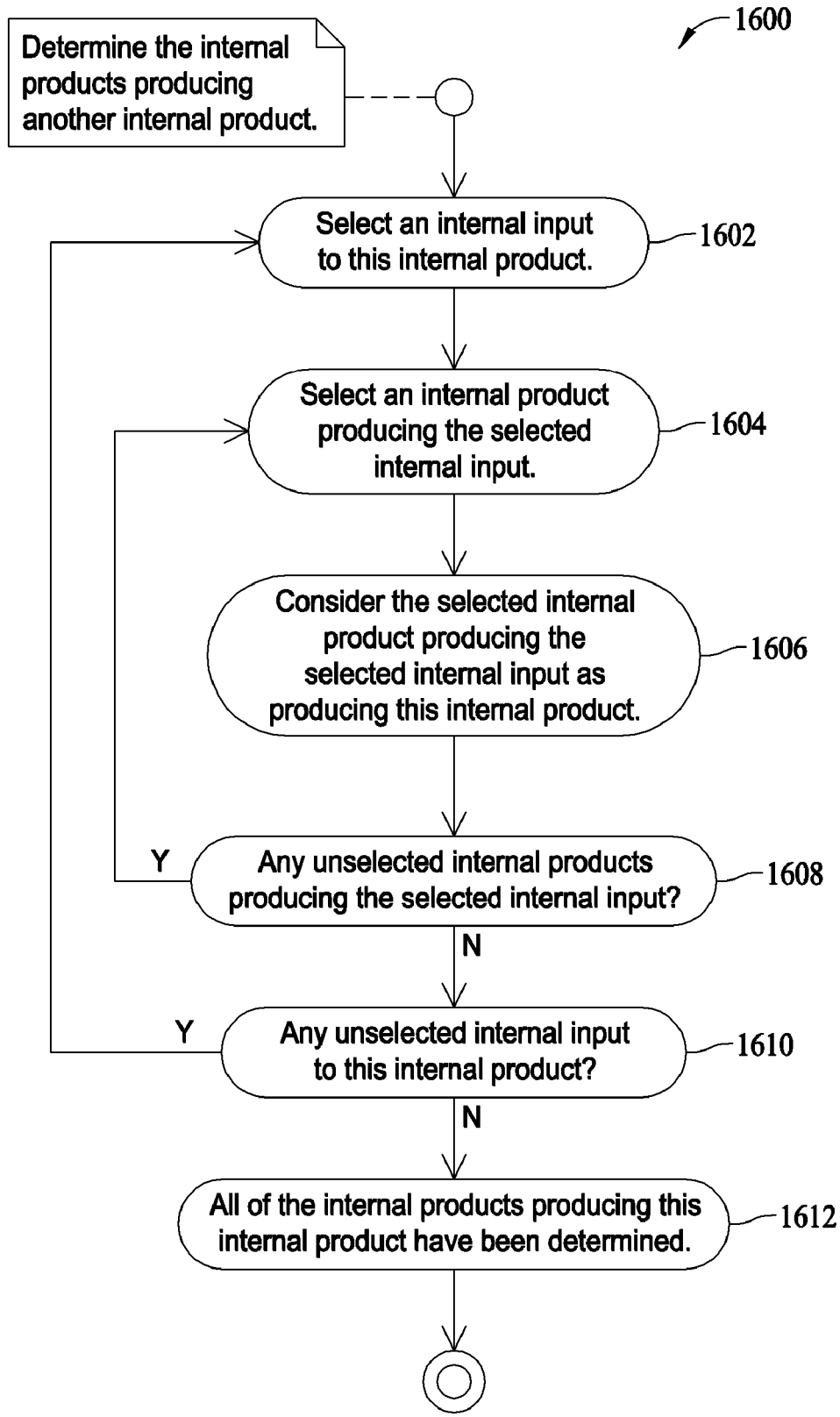
FIG. 16 is a flow chart of an exemplary method of determining the internal products producing another internal product.

FIG. 16 is a flow chart of an exemplary method 1600 of determining the internal products producing another internal product. In the exemplary embodiment, method 1600 includes selecting 1602 an internal input to this internal product, selecting 1604 an internal product producing the selected internal input, and considering 1606 the selected internal product producing the selected internal input as producing this internal product. Method 1600 also includes determining if any unselected internal products are producing the selected internal input. If yes, method 1600 loops back to selecting 1604 an internal product producing the selected internal input. If no, method 1600 proceeds to determining 1610 if there is any unselected internal input to this internal product. If yes, method 1600 loops back to selecting 1602 an internal input to this internal product. The steps of method 1600 end when all of the internal products producing this internal product have been determined 1612.

Figure 17:
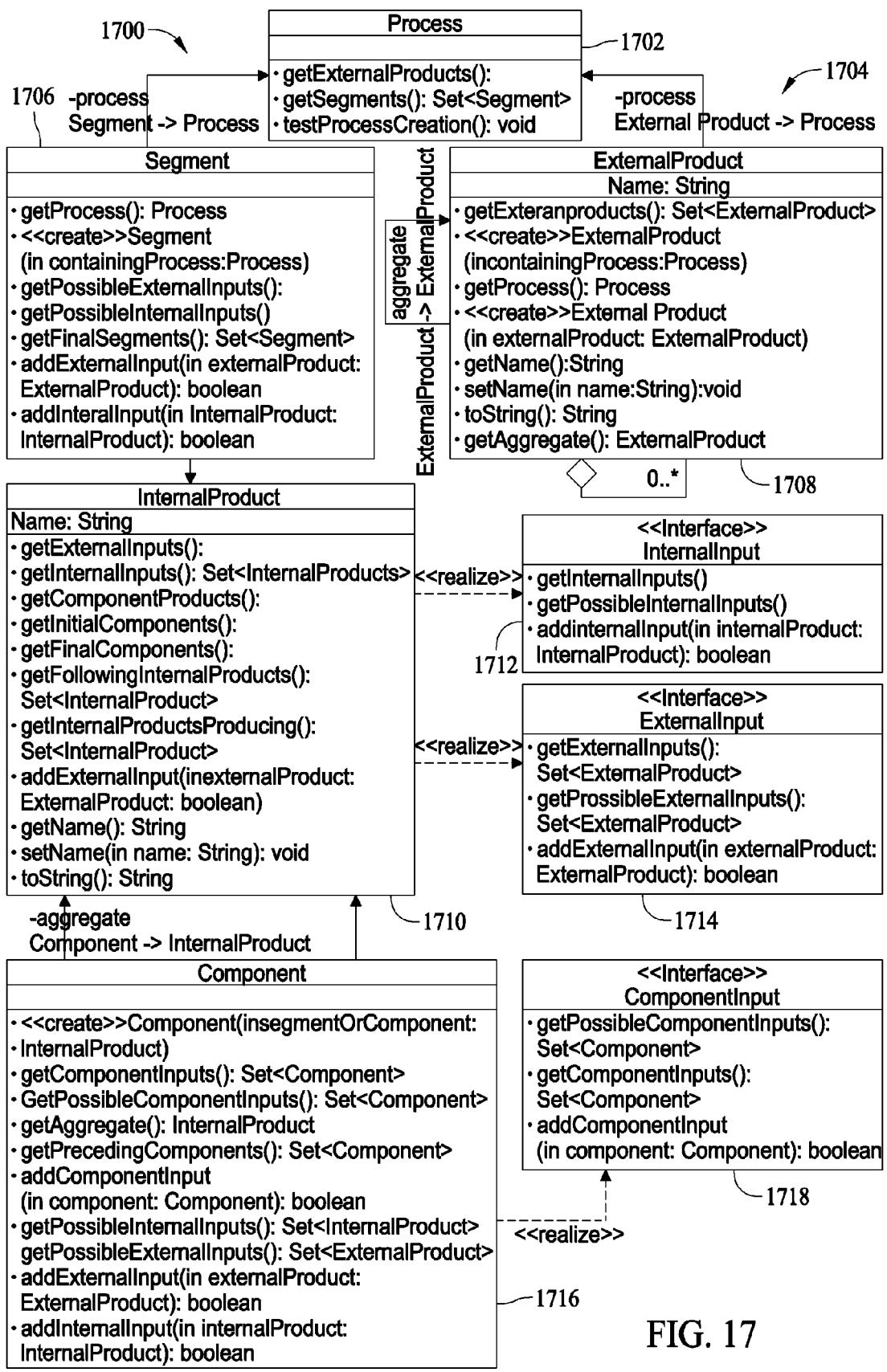
FIG. 17 is a class-relation diagram that illustrates a set of relationships among objects employed by system for constructing scalable robust feed-forward processes in accordance with an embodiment of the present disclosure.

FIG. 17 is a class-relation diagram 1700 that illustrates a set of relationships among objects employed by system 10 for constructing scalable robust feed-forward processes in accordance with an embodiment of the present disclosure. Class-relation diagrams may be used for object-oriented analysis and design. Typically, class-relation diagrams show the classes of the system, their interrelationships (including inheritance, aggregation, and association), and the operations and attributes of the classes. Class-relation diagram 1700 may be used for a wide variety of purposes, including both conceptual/domain modeling and detailed design modeling. Specifically, class-relation diagram 1700 illustrates an organization of the functionality in one cohesive object-oriented framework. The functionality may be organized to simplify application maintenance. Further, the functionality may be organized to provide extensibility and consistency. In this manner, system 10 may support new processes, components and segments which may be candidates for future additions to the process.

The hierarchy in class-relation diagram 1700 includes a parent process 1702. Process 1702 may include common functionality employed by system 10. Remaining classes 1704 for example, but not limited to segments 1706, external products 1708, internal products 1710, internal input 1712, external output 1714, component 1716, and component input 1718 may support functionality related to the methods described above, for example, in relation to FIGS. 3-16.

Class-relation diagram 1700 described above is exemplary. Therefore, system may employ a larger or smaller number of classes and/or different classes. Further, the relationship among such classes may be different.

The foregoing description discloses only exemplary embodiments of the disclosure. Modifications of the above disclosed apparatus and methods which fall within the scope of the disclosure will be readily apparent to those of ordinary skill in the art. For instance, the present disclosure may be employed in a variety of programmatic environments and platforms. For example, the present disclosure may be employed as a standalone or web application. Further, the present disclosure provides methods and apparatus for constructing scalable robust feed-forward processes defined using a hierarchical product framework that encompasses only feasible internal product interactions.

In this manner, the present disclosure may provide a solution for maintaining consistency and extensibility among various segments of a process or among various processes. Such solution may simplify the construction process by enabling user to reuse previously-defined segment definitions and adapt to process changes with minimal effort. More specifically, embodiments of the present disclosure employ a design model that breaks down common process components into individual reusable components. For example, the embodiments of the present disclosure may enable a user to quickly and easily define and perform new requests for process extension or enhancements without having to write code.

As will be appreciated by one skilled in the art and based on the foregoing specification, the above-described embodiments of the disclosure may be implemented using computer programming or engineering techniques including computer software, firmware, hardware or any combination or subset thereof, wherein the technical effect is constructing scalable robust feed-forward processes defined using a hierarchical product framework that encompasses only feasible internal product interactions. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described methods and systems for constructing scalable robust feed-forward processes defined using a hierarchical product framework that encompasses only feasible internal product interactions are cost-effective and highly reliable. The methods and systems include identifying important process elements, feasible interrelationships within process elements and process hierarchical interrelationships and facilitates reuse of processes, and creates a facility to integrate multiple processes while maintaining consistency of inputs and outputs to permit extensible architectures of processes. Accordingly, the methods and systems facilitate construction of the network in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A computer-implemented method of constructing a scalable feed-forward model of a process for fabricating a product and presenting the model to a user in a tangible form, the product including one or more of a physical item, information produced, and information required in the product fabrication process, said method comprising:

defining, via a computer system, each segment and component for inclusion into the model, where each segment is an internal product of the process that is not a component of another internal product of the process, where each component is at least one of an internal product of the process that is a component of another internal product of the process, an internal product including one or more of a physical item, produced information, and information utilized in the fabrication of the product;

defining, via the computer system, external products for inclusion into the model as products in which no input relationship there between is specified, an external product including one or more of a physical item, produced information, and information utilized in the fabrication of the product;

determining which of the defined segments are final segments of the process, by determining which of the segments are not inputs to another segment;

initiating construction of the model using the final segments;

organizing the non-final segments, components, and external products into a hierarchy extending from the final segments, based upon which of the non-final segments provide an input into another segment and one or more of external products, internal products, and components that provide an input into a segment to complete the feed-forward model of the product fabrication process; and expressing the model to a computer-readable medium in terms of the defined final segments, defined non-final segments, defined components, and defined external products.

2. A method in accordance with claim 1 wherein determining which of the segments are final segments of the process further comprises:

determining the possible internal inputs to at least one of the defined segments;

determining if any internal products occur forward of the at least one segment; and designating the at least one segment as a final segments of the process if no internal products occur forward of the at least one segment.

3. A method in accordance with claim 1, wherein for components that are components of another internal product of the process, said method further comprises:

determining component inputs for at least one component; and determining the internal products which utilize the component inputs.

4. A method in accordance with claim 1 further comprising determining the external products and internal products, including components and segments, that precede another internal product in the feed-forward model.

5. A method in accordance with claim 1 further comprising:

determining if any internal products occur forward of at least one internal product; and determining the final components of the at least one internal product if no internal products occur forward thereof.

6. A method in accordance with claim 1 further comprising assigning identifiers of a data dictionary defining a hierarchy of external products to outputs of the process, wherein external products comprise products created by a process other than the scalable feed-forward process that creates the final physical product, wherein the outputs have the same hierarchical relationships within the process as the identified products in the dictionary.

7. A method in accordance with claim 6 wherein the dictionary defines the hierarchy of external products including a plurality of entries, each entry assigned a unique identifier to distinguish it from similarly identified entries.

8. A method in accordance with claim 6 further comprising constructing the model such that identifiers of the dictionary assigned to at least some of the outputs of the process have the same hierarchical relationships within the process as the identified outputs in the dictionary.

9. A method in accordance with claim 1 further comprising combining a first process and a second process to construct the scalable feed-forward process using a data dictionary wherein at least some internal products of the first process are external products of the second process and wherein no internal products of the second process are external products of the first process.

10. A method in accordance with claim 1 further comprising creating a second process by extraction from a first process wherein initial and final internal outputs are selected from the segments and the non-segment internal products of the first process.

11. A computer system for use in producing a model that defines a final physical product by a construction process, said computer system programmed to execute computer-readable code to:
    identify a plurality of segments that define a feed-forward network, wherein each segment of the plurality of segments represents an internal product of the construction process, includes one or more components, and is not included in another segment;
    model each component of the components included in the plurality of segments by:
        defining one or more outputs of the component; and
        determining a plurality of outputs of at least one other component that are combinable to create the output of the component, wherein the determined outputs of the other component are inputs of the component;
    order the components hierarchically based on the inputs and outputs of the components;
    determine one or more inputs and one or more outputs of each segment of the plurality of segments based on the inputs and outputs of the components included therein; and
    order the segments hierarchically for storage within said computer system based on the inputs and outputs of the segments, wherein the hierarchically ordered segments describe the construction process for the final physical product; and
    present the hierarchically ordered segments via a user interface.

12. A computer system in accordance with claim 11 wherein said computer system is further programmed to execute computer-readable code to define a hierarchy of external products in the process based upon the ordered components which receive one or more of the external products as an input.

13. A computer system in accordance with claim 12 wherein a dictionary defines an external output hierarchy including a plurality of entries, each entry assigned a unique identifier to distinguish it from similarly identified entries.

14. A computer system in accordance with claim 12 wherein said computer system is further programmed to execute computer-readable code to construct the process such that identifiers of the dictionary assigned to at least some of the outputs of the process have the same hierarchical relationships within the process as the identified outputs in the dictionary.

15. A system in accordance with claim 11 wherein said computer system is further programmed to execute computer-readable code to create a second process by extraction from a first process wherein initial and final internal outputs of the second process are selected from the segments and components of the first process.

16. A method of generating large scale complex system integration of a process for creating a final product, the final product including one or more of a physical item, information produced, and information required in the fabrication process, the method comprising:
    identifying, by a computer system, each segment associated with the process for creating the final product, where a segment is an internal product of the process that is not a component of another internal product of the process;
    modeling, by the computer system, each identified segment component by determining component inputs and outputs to produce an output for each respective identified segment;
    organizing, by the computer system, a portion of the modeled segments into a first level hierarchy based on the output of each segment not being an input into another segments or an input into an internal product, such that a feed-forward network defining a final portion of the process is formed;
    organizing, by the computer system, the remaining modeled segments, internal products and external products into a hierarchy extending from previously organized segments, based upon which of the remaining segments provide an input into another segment and based further upon one or more of external products, internal products, and components that provide inputs into the modeled segment; and
    storing the organized hierarchy of modeled segments and external products defining the process for creating the final product in a storage area of the computer system.

17. A method in accordance with claim 16 further comprising applying at least one breakdown rule such that local modularity within the components of the model is maintained.

18. A method in accordance with claim 16 further comprising assigning identifiers of a dictionary defining a hierarchy of external products to the outputs of the segments and internal products forming the process wherein the outputs have the same hierarchical relationships within the process as the identified outputs in the dictionary.

* * * * *